(12) United States Patent
Jeon et al.

(10) Patent No.: US 10,688,914 B1
(45) Date of Patent: Jun. 23, 2020

(54) VEHICLE LAMP

(71) Applicant: SL Corporation, Daegu (KR)

(72) Inventors: Won Hong Jeon, Gyeongsan-si (KR); Sun Kyoung Park, Gyeongsan-si (KR); Da Il Kang, Gyeongsan-si (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 16/530,207

(22) Filed: Aug. 2, 2019

(30) Foreign Application Priority Data

Dec. 12, 2018 (KR) .................... 10-2018-0159827
Feb. 28, 2019 (KR) .................... 10-2019-0023729

(51) Int. Cl.
| | |
|---|---|
| *F21V 21/00* | (2006.01) |
| *B60Q 1/26* | (2006.01) |
| *B60Q 3/18* | (2017.01) |
| *B60Q 3/85* | (2017.01) |
| *H02J 7/00* | (2006.01) |
| *B60Q 11/00* | (2006.01) |

(52) U.S. Cl.
CPC ............ *B60Q 1/2607* (2013.01); *B60Q 3/18* (2017.02); *B60Q 3/85* (2017.02); *B60Q 11/007* (2013.01); *H02J 7/0021* (2013.01); *H02J 7/0047* (2013.01); *H02J 7/0048* (2020.01); *H02J 7/0049* (2020.01)

(58) Field of Classification Search
CPC .......... B60Q 1/2607; B60Q 3/18; B60Q 3/85; B60Q 1/007; H02J 7/0021; H02J 7/0047; H02J 7/0048; H02J 7/0049; F21S 43/239
USPC ........ 362/511, 616, 547, 617, 601, 602, 603
See application file for complete search history.

(56) References Cited

U.S. PATENT DOCUMENTS

| | | | | |
|---|---|---|---|---|
| 8,764,266 B2 * | 7/2014 | Urtiga | ............. | G09F 13/18 362/612 |
| 8,998,436 B2 * | 4/2015 | Ke | ............. | G02B 6/0068 362/231 |
| 8,998,479 B2 * | 4/2015 | Brick | ............. | G02B 6/0041 362/608 |
| 9,103,959 B2 * | 8/2015 | Jeong | ............. | G02B 6/003 |
| 10,173,131 B2 * | 1/2019 | Fujita | ............. | G02B 6/0036 |
| 10,447,987 B2 * | 10/2019 | Lee | ............. | H04N 13/128 |
| 10,488,577 B2 * | 11/2019 | Ochi | ............. | G02B 6/0043 |

(Continued)

FOREIGN PATENT DOCUMENTS

| | | |
|---|---|---|
| KR | 10-20040049963 A | 6/2004 |
| KR | 10-20180068393 A | 6/2018 |
| WO | 2016190702 A1 | 12/2016 |

*Primary Examiner* — Laura K Tso
(74) *Attorney, Agent, or Firm* — Nelson Mullins Riley & Scarborough LLP; Kongsik Kim, Esq.

(57) ABSTRACT

Provided is to a vehicle lamp capable of displaying images with various colors or shapes. The vehicle lamp includes an image display for displaying an image formed by a plurality of image forming units, each of the plurality of image forming units including a light source unit and a light guide for emitting light incident from the light source unit; and a controller configured to generate an image at least one of the plurality of image forming units. In particular, the plurality of image forming units comprises a first image forming unit comprising a first light source unit and a first light guide; and a second image forming unit comprising a second light source unit and a second light guide. The light emitted from the first light guide is transmitted through the second light guide and emitted.

18 Claims, 16 Drawing Sheets

(56) References Cited

U.S. PATENT DOCUMENTS

| | | | |
|---|---|---|---|
| 2010/0053133 A1* | 3/2010 | Furuta | G02B 6/002 345/207 |
| 2010/0073911 A1* | 3/2010 | Ohkawa | G02B 6/0016 362/97.1 |
| 2011/0007524 A1* | 1/2011 | Nagatani | G02B 6/0061 362/616 |
| 2012/0087145 A1* | 4/2012 | Hudson | F21V 11/00 362/601 |
| 2013/0229828 A1* | 9/2013 | Chen | G02B 6/0076 362/616 |
| 2015/0316227 A1* | 11/2015 | Sahlin | B60Q 1/0058 362/511 |

* cited by examiner

VEHICLE LAMP

CROSS-REFERENCE TO RELATED APPLICATION

This application claims the benefit of priority from Korean Patent Application No. 10-2018-0159827 filed on Dec. 12, 2018 and Korean Patent Application No. 10-2019-0023729 filed on Feb. 28, 2019, which applications are herein incorporated by reference in their entirety.

BACKGROUND

1. Technical Field

The present disclosure relates to a vehicle lamp, and more particularly to a vehicle lamp capable of displaying images with various colors or shapes.

2. Description of the Related Art

Generally, a vehicle is equipped with various lamps having an illumination function for easily confirming an object positioned in the vicinity of the vehicle at low light condition driving (e.g., at night), and a signaling function for notifying other vehicle or road users of the driving state of the vehicle. For example, the main purpose of head lamps and fog lamps is the illumination function, and the main purpose of turn signal lamps, position lamps, tail lamps, brake lamps, or the like is the signaling function.

In recent years, research on electric vehicles has been actively carried out in view of the possibility of solving environmental pollution and energy problems. Accordingly, the electric vehicle may be provided with a lamp for illuminating and signaling purposes and a lamp for allowing the driver to easily recognize the charging state of the battery. The electric vehicle is a vehicle that mainly uses a battery to drive a motor to obtain power, and is classified as battery-only electric vehicles and hybrid electric vehicles. The battery-only electric vehicle uses battery power to drive the motor to obtain power, and recharges the battery when necessary. The hybrid electric vehicle uses an internal combustion engine as the main driving force, and uses power from the the motor as auxiliary power.

When electric power of the battery is low, the battery is charged at a charging station, and the driver waits near the charging station until the charging of the battery is completed through a lamp that indicates a charging state of the battery. As such, the vehicle has various lamps, and if each lamp is separately provided, the space required for installing the lamp increases. Therefore, there is a need for a method of sufficiently exhibiting the function of each lamp while reducing the space required for installing various lamps.

SUMMARY

A problem to be solved by the present disclosure is to provide a vehicle lamp capable of sufficiently exhibiting each function while reducing the space required for the installation of various lamps for different functions. Problems of the present disclosure are not limited to the above-mentioned problem, and other problems not mentioned may be clearly understood by a person skilled in the art from the following description.

According to an aspect of the present invention, a vehicle lamp is provided. The vehicle lamp may include an image display for displaying an image formed by a plurality of image forming units, each of the plurality of image forming units including a light source unit and a light guide for emitting light incident from the light source unit; and a controller configured to generate an image by at least one of the plurality of image forming units. In particular, the plurality of image forming units may include a first image forming unit including a first light source unit and a first light guide through which light incident from the first light source unit is emitted; and a second image forming unit including a second light source unit and a second light guide through which light incident from the second light source unit is emitted. The light emitted from the first light guide may be transmitted through the second light guide and emitted.

Other specific details of the present disclosure are included in the detailed description and drawings.

A vehicle lamp according to an exemplary embodiment of the present disclosure has one or more of the following benefits. Light emitted from one of light guides of the plurality of image forming units may be transmitted through the other one of the light guides to form images suitable for lamps having different functions. Therefore, each function may be sufficiently achieved while reducing the space for installing various lamps.

The benefits of the present disclosure are not limited to the above-mentioned benefits, and other benefits not mentioned may be clearly understood by a person skilled in the art from the claims.

DETAILED DESCRIPTION

Figure 1:
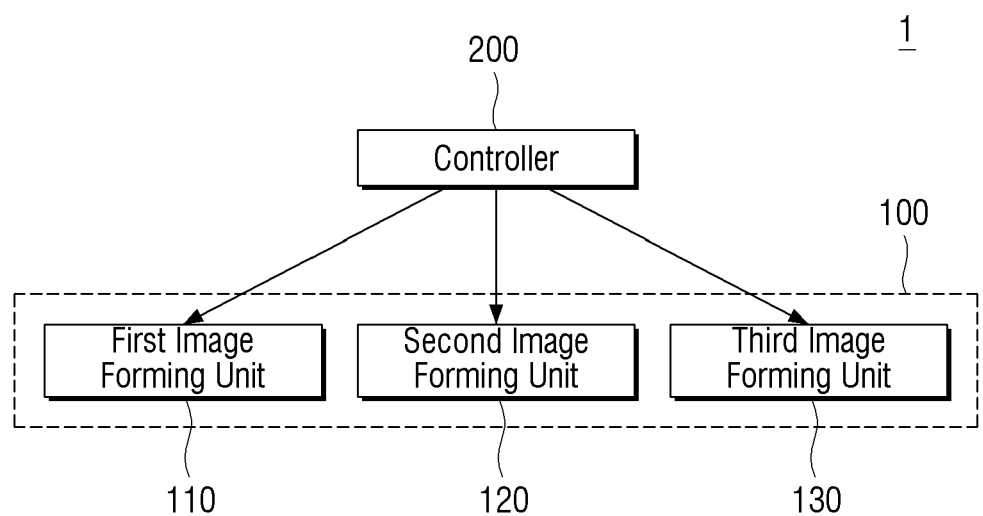
FIG. 1 is a block diagram showing the configuration of a vehicle lamp according to an exemplary embodiment of the present disclosure.

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the exemplary embodiments set forth herein. Rather, the exemplary embodiments are provided so that this disclosure will be thorough and complete and will fully convey the concept of the disclosure to those skilled in the art, and the present disclosure will only be defined by the appended claims. Throughout the specification, like reference numerals in the drawings denote like elements. In some exemplary embodiments, well-known steps, structures and techniques will not be described in detail to avoid obscuring the disclosure.

The terminology used herein is for the purpose of describing exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Exemplary embodiments of the present disclosure are described herein with reference to plan and cross-section illustrations that are schematic illustrations of exemplary embodiments of the present disclosure. As such, variations from the shapes of the illustrations as a result, for example, of manufacturing techniques and/or tolerances, are to be expected. Thus, exemplary embodiments of the present disclosure should not be construed as limited to the particular shapes of regions illustrated herein but are to include deviations in shapes that result, for example, from manufacturing. In the drawings, respective components may be enlarged or reduced in size for convenience of explanation.

Hereinafter, the present disclosure will be described with reference to the drawings for explaining a vehicle lamp according to exemplary embodiments of the present disclosure.

FIG. 1 is a block diagram showing the configuration of a vehicle lamp according to an exemplary embodiment of the present disclosure. Referring to FIG. 1, a vehicle lamp 1 according to an exemplary embodiment of the present disclosure may include an image display 100 and a controller 200. The vehicle lamp 1 of the present disclosure may be used for various lamps installed in a vehicle such as a head lamp, a tail lamp, a fog lamp, a daytime running lamp, a position lamp, a turn signal lamp, a backup lamp, or the like. Further, it may be used for the purpose of a welcoming function for emphasizing the communication between the vehicle and a driver by allowing the vehicle to show a welcoming response to the driver when the driver approaches or board the vehicle. In addition, it may be used to display a charging state of a battery of an electric vehicle which drives a motor using the power of the battery to obtain the power, to allow the driver to more easily check the charging state of the battery.

Figure 2:
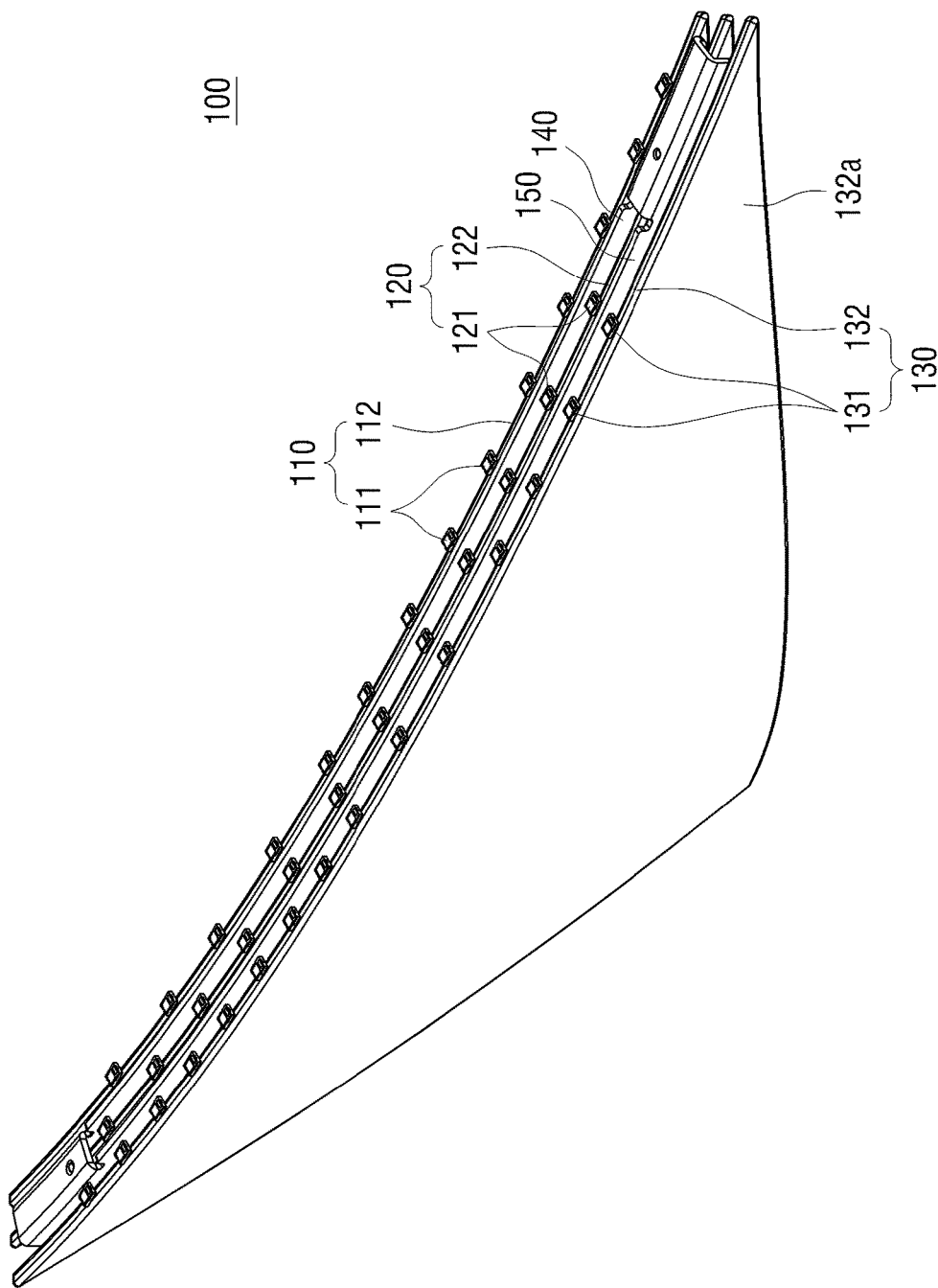
FIGS. 2 and 3 are perspective views showing an image display according to an exemplary embodiment of the present disclosure.
Figure 3:
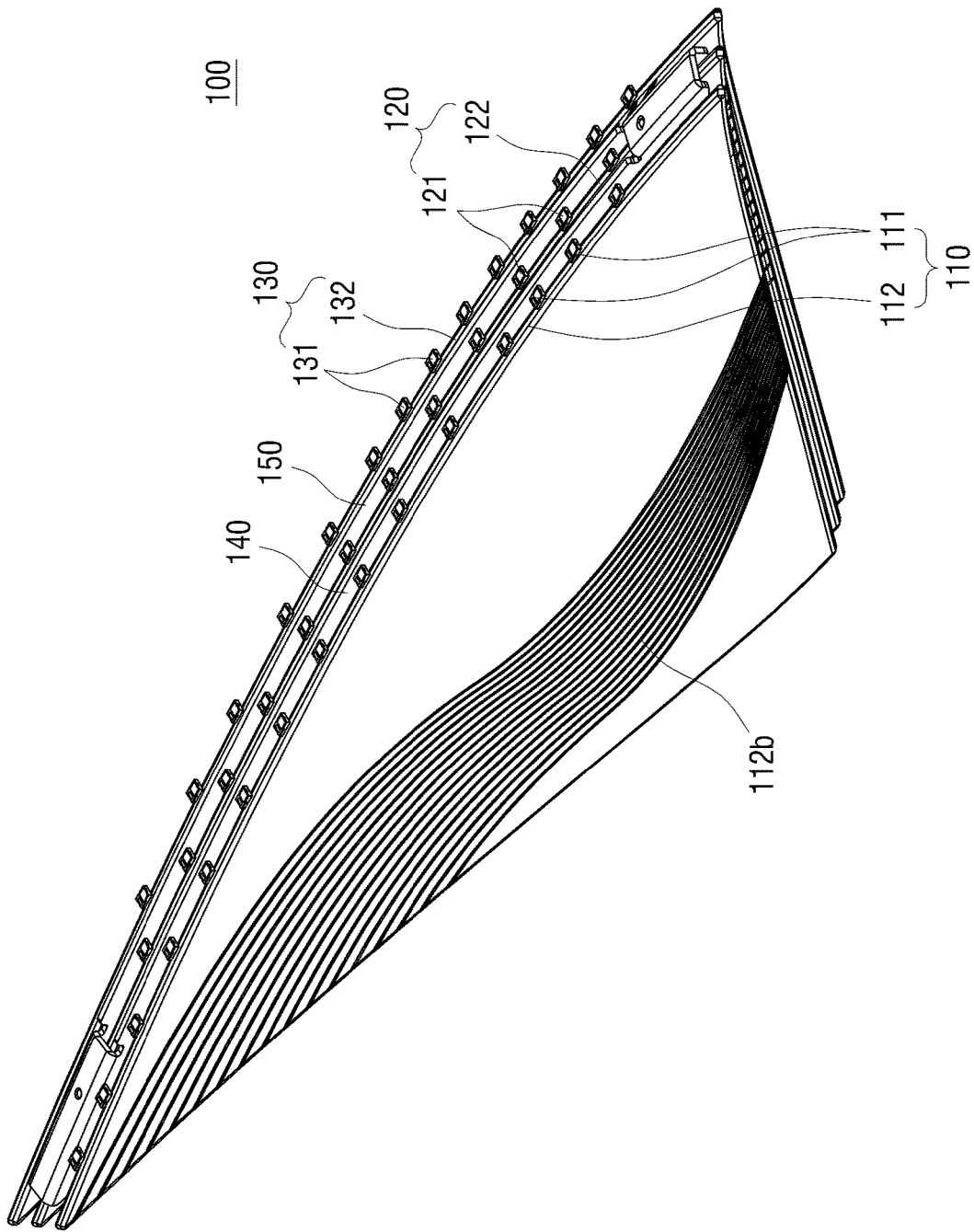
Figure 4:
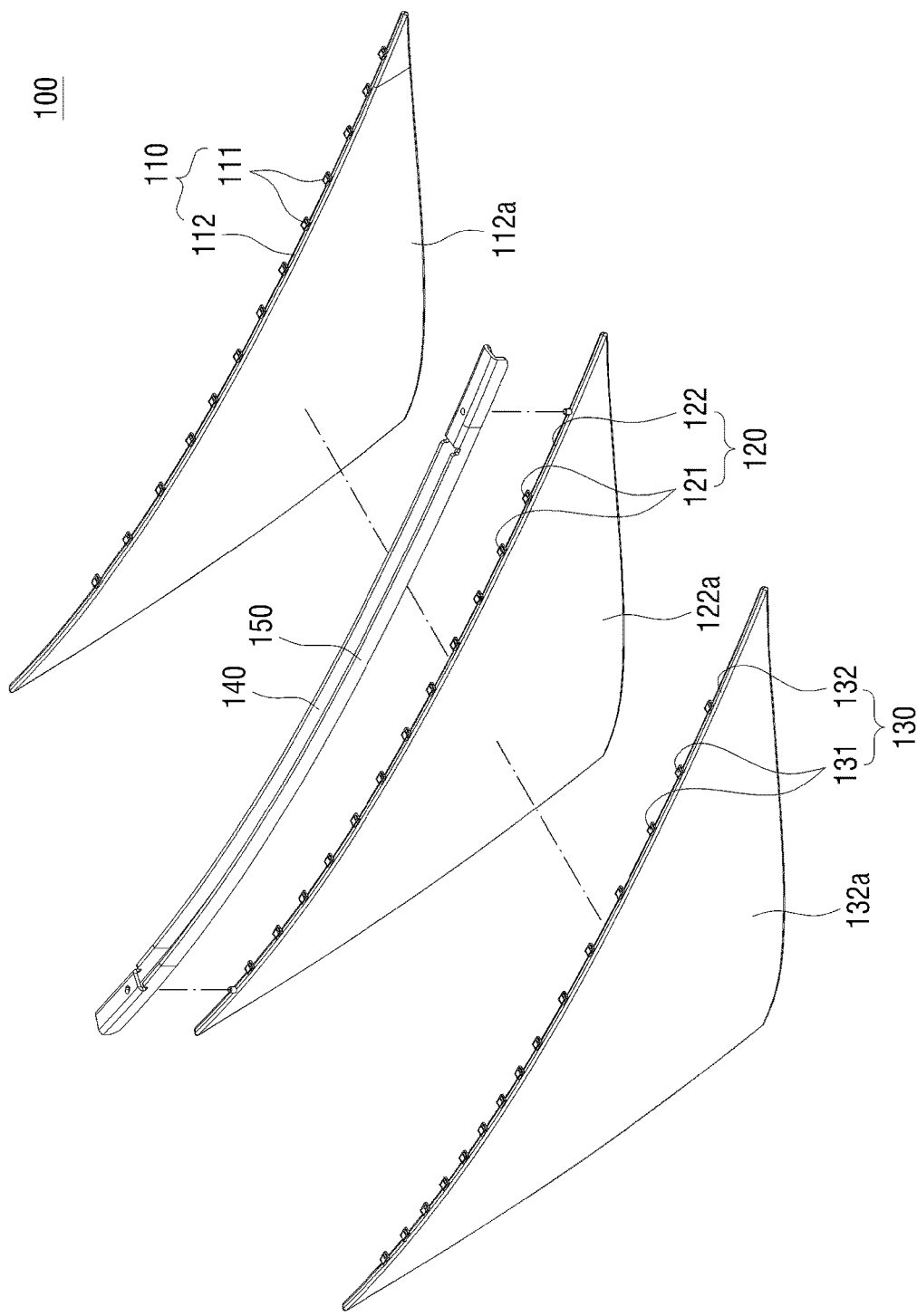
FIGS. 4 and 5 are exploded perspective views showing an image display according to an exemplary embodiment of the present disclosure.
Figure 5:
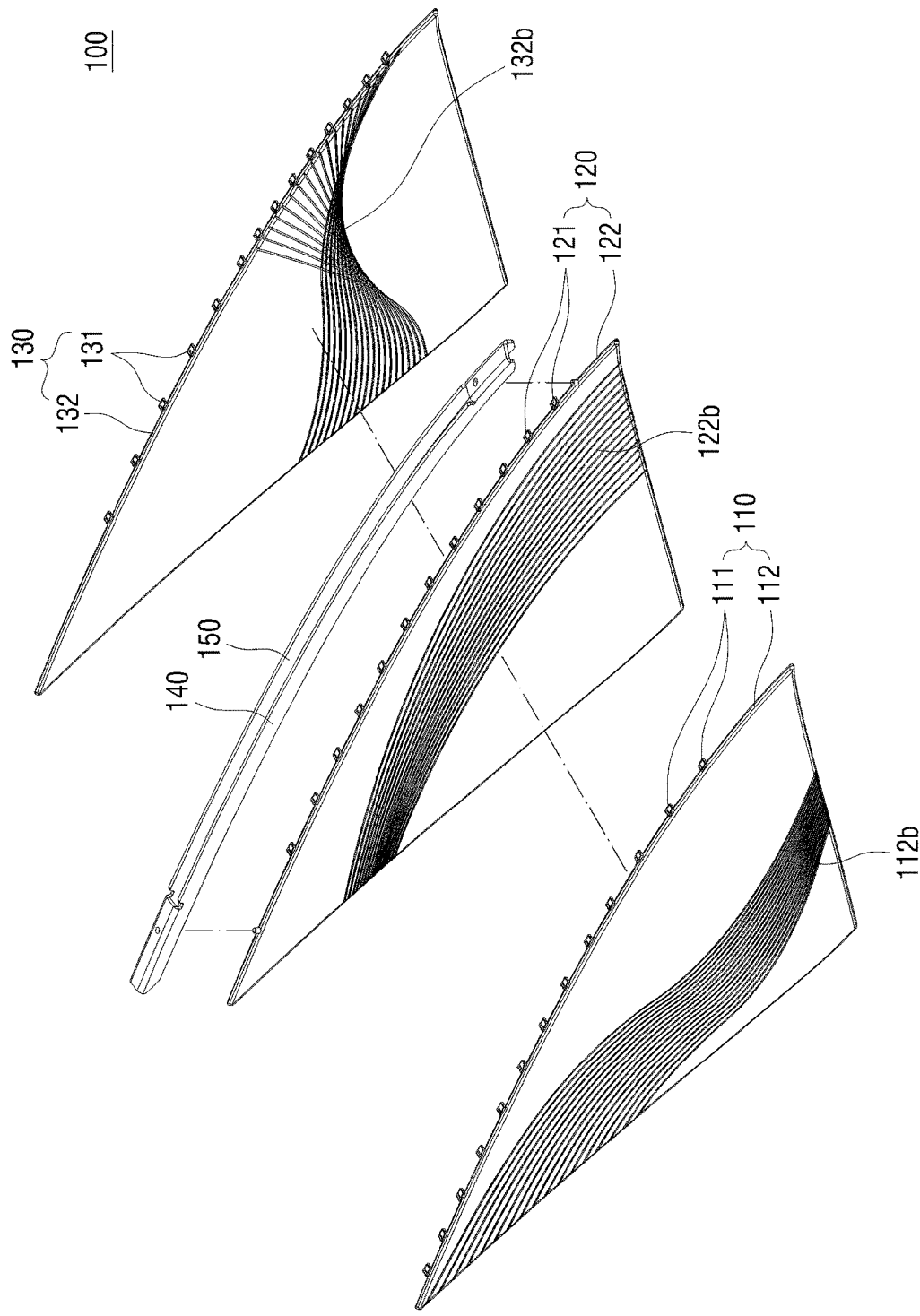
Figure 6:
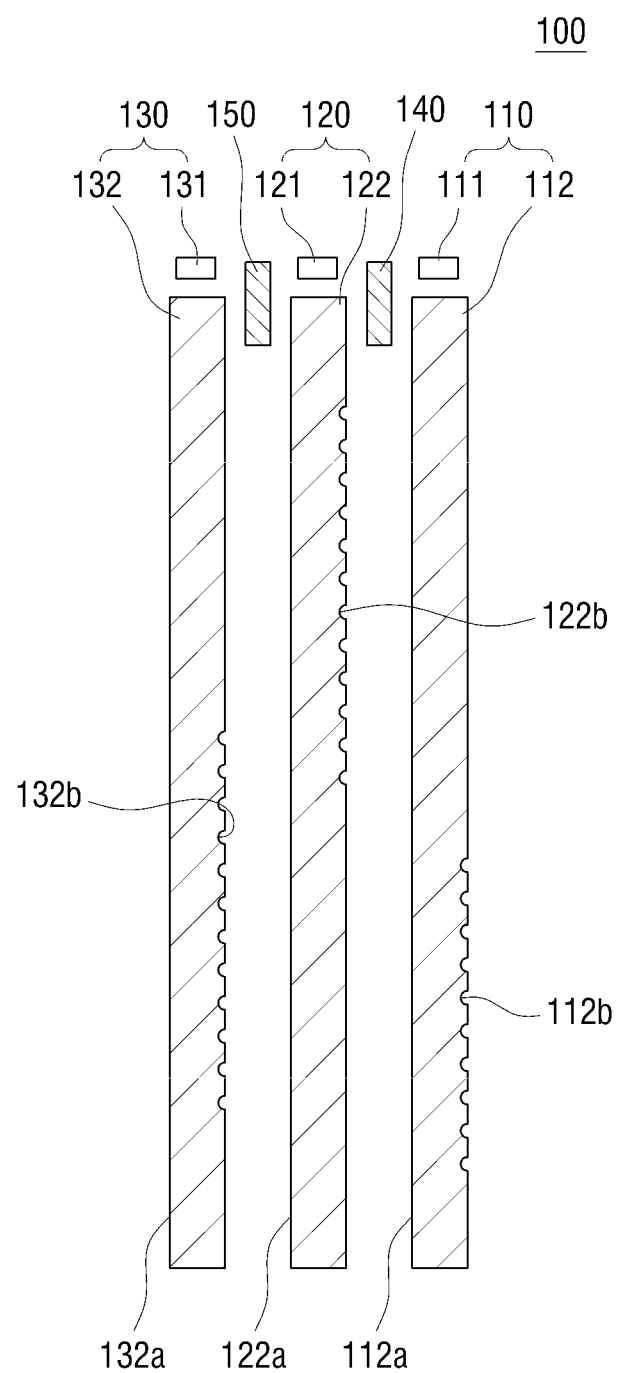
FIG. 6 is a cross-sectional view showing an image display according to an exemplary embodiment of the present disclosure.

FIGS. 2 and 3 are perspective views showing an image display according to an exemplary embodiment of the present disclosure. FIGS. 4 and 5 are exploded perspective views showing an image display according to an exemplary embodiment of the present disclosure. FIG. 6 is a cross-sectional view showing an image display according to an exemplary embodiment of the present disclosure. Referring to FIGS. 2 to 6, the image display 100 according to an exemplary embodiment of the present disclosure may include a plurality of image forming units 110, 120, and 130, in which the image display 100 may display an image formed by at least one of the plurality of image forming units 110, 120, and 130.

In an exemplary embodiment of the present disclosure, the image display 100 may receive power from a battery of a vehicle. However, the present disclosure is not limited thereto, and the image display 100 may be supplied with power from a battery or a power supply provided separately from the battery of the vehicle. In an example of the exemplary embodiment of the present disclosure, the plurality of image forming units 110, 120, and 130 may be arranged along the front and rear direction. When the plurality of image forming units 110, 120, and 130 are arranged in the front and rear direction, it is assumed that the front refers to a direction in which light is emitted to display an image from the image display 100. Depending on a direction or position in which the image display 100 is installed, a direction actually referred to by the front and rear may vary.

Hereinafter, each of the plurality of image forming units 110, 120, and 130 of the exemplary embodiment of the present disclosure will be referred to as a first image forming unit 110, a second image forming unit 120, and a third image forming unit 130 in a direction from the rear toward the front along a direction in which light is emitted from the image display 100. In an exemplary embodiment of the present disclosure, the image display 100 may include three image forming units 110, 120, and 130. However, it is merely an example for facilitating understanding of the present disclosure. The present disclosure is not limited thereto, and the image display 100 may include two or more image forming units arranged in a direction in which light is emitted from the image display 100.

The first image forming unit 110 may include a first light source unit 111 and a first light guide 112, in which when light is generated from the first light source unit 111, a first image may be formed by the first light guide 112. The first light source unit 111 may include at least one light source disposed at one side end of the first light guide 112, in which the first light guide 112 may allow light incident from the first light source unit 111 to be emitted to an emitting surface 112*a*. The first light guide 112 may be formed with a first reflection pattern 112*b* on an opposite side of the emitting surface 112*a* to allow light incident from the first light source unit 111 to be reflected by the emitting surface 112*a*, in which an area where the first reflection pattern 112*b* is formed may vary based on a shape of the first image formed by the first image forming unit 110.

In an exemplary embodiment of the present disclosure, the first reflection pattern 112*b* may be formed to have a protrusion and depression shape by the surface processing of the first light guide 112. However, the present disclosure is not limited thereto, and the first reflection pattern 112*b* may be in the form of a film and be attached to the first light guide 112.

The second image forming unit 120 may be disposed in front of the first image forming unit 110. The second image forming unit 120 may include a second light source unit 121 and a second light guide 122, in which when light is generated from the second light source unit 121, a second image may be formed by the second light guide 122. The second light source unit 121 may include at least one light source disposed at one end of the second light guide 122, in which the second light guide 122 may allow light incident from the second light source unit 121 to be emitted to an emitting surface 122*a*.

The second light guide 122 may be formed with a second reflection pattern 122*b* on an opposite side of the emitting surface 122*a* to allow light incident from the second light source unit 121 to be reflected by the emitting surface 122*a*, in which an area where the second reflection pattern 122*b* is formed may vary based on a shape of the second image formed by the second image forming unit 120. In an exemplary embodiment of the present disclosure, the second reflection pattern 122*b* may be formed to have a protrusion and depression shape by the surface processing of the second light guide 122. However, the present disclosure is not limited thereto, and the second reflection pattern 122*b* may be in the form of a film and be attached to the second light guide 122.

In particular, the first light guide 112 and the second light guide 122 may be disposed to allow one surface thereof to face each other, and the emitting surface 112*a* of the first light guide 112 and the emitting surface 122*a* of the second light guide 122 may be disposed to face the same direction. Accordingly, light emitted through the emitting surface 112*a* of the first light guide 112 may be transmitted through the second light guide 122 and emitted.

The third image forming unit 130 may be disposed in front of the second image forming unit 120. The third image forming unit 130 may include a third light source unit 131 and a third light guide 132, in which when light is generated from the third light source unit 131, a third image may be formed by the third light guide 132. The third light source unit 131 may include at least one light source disposed at one side end of the third light guide 132, in which the third light guide 132 may serve to allow light incident from the third light source unit 131 to be emitted to an emitting surface 132*a*.

The third light guide 132 may be formed with a third reflection pattern 132*b* on an opposite side of the emitting surface 132*a* to allow light incident from the third light source unit 131 to be reflected by the emitting surface 132*a*, in which an area where the third reflection pattern 132*b* is formed may vary based on a shape of the third image formed by the third image forming unit 130. In an exemplary embodiment of the present disclosure, the third reflection pattern 132*b* may be formed to have a protrusion and depression shape by the surface processing of the third light guide 132. However, the present disclosure is not limited thereto, and the third reflection pattern 132*b* may be in the form of a film and be attached to the third light guide 132.

In particular, the second light guide 122 and the third light guide 132 may be disposed to allow one surface thereof to face each other, and the emitting surface 122*a* of the second light guide 122 and the emitting surface 132*a* of the third light guide 132 may be disposed to face the same direction. Accordingly, light emitted through the emitting surface 122*a* of the second light guide 122 may be transmitted through the third light guide 132 and emitted.

Further, since the emitting surface 112*a* of the first light guide 112 and the emitting surface 122*a* of the second light guide 122 are disposed to face the same direction, light emitted through the emitting surface 112*a* of the first light guide 112 may be transmitted through the second light guide 122 and the third light guide 132 and emitted. In other words, it may be understood that when the image display 100 includes a plurality of image forming units, light emitted from one of the plurality of image forming units may be transmitted through all of the light guides positioned in front of the light guide. For example, when the image display 100 includes two image forming units, light emitted from the light guide of the image forming portion disposed most rearward may be transmitted through one light guide disposed in front of the light guide. When the image display 100 includes four image forming units, light emitted from the light guide of the image forming portion disposed most rearward may be transmitted through all three light guides disposed in front of the light guide.

Figure 7:
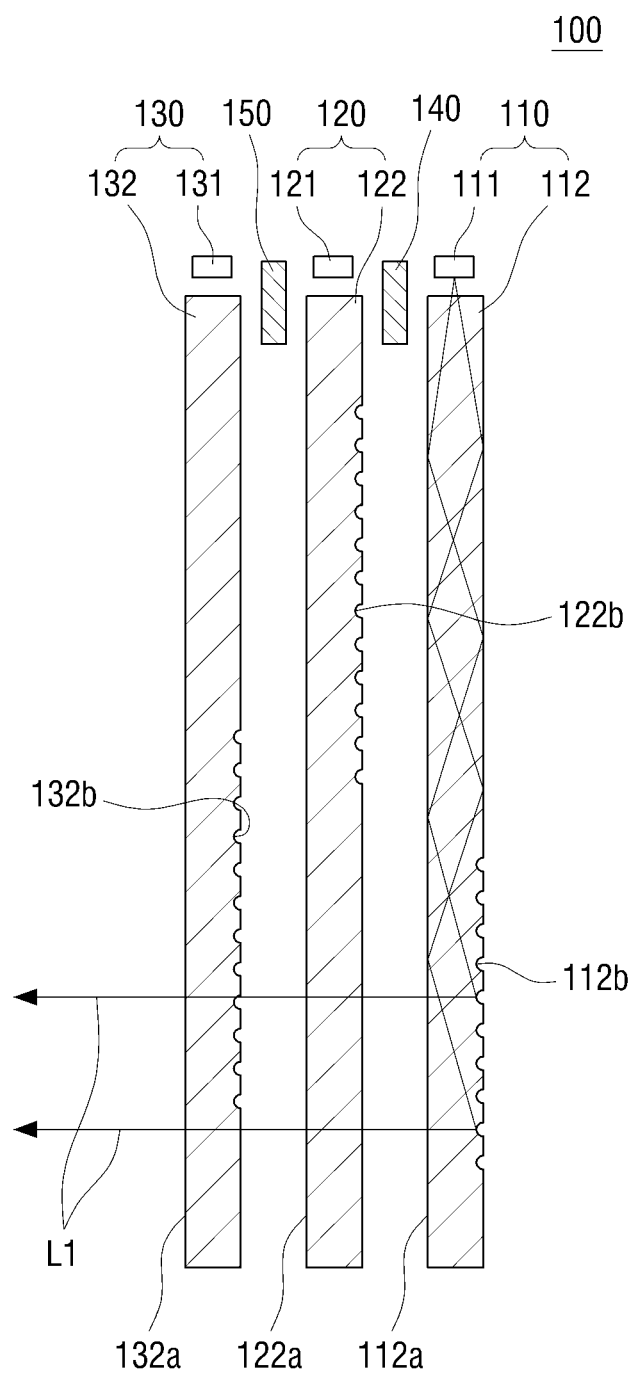
FIG. 7 is a schematic view showing an optical path by a first image forming unit according to an exemplary embodiment of the present disclosure.
Figure 8:
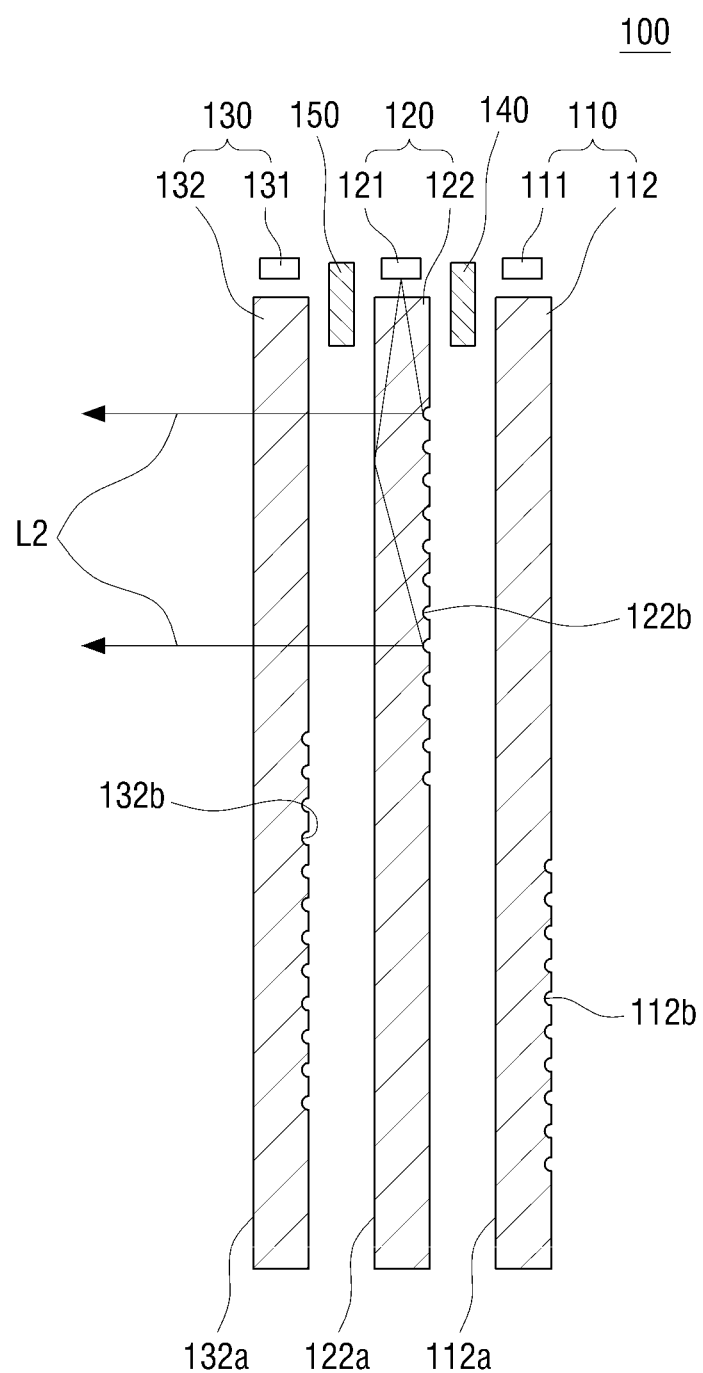
FIG. 8 is a schematic view showing an optical path by a second image forming unit according to an exemplary embodiment of the present disclosure.
Figure 9:
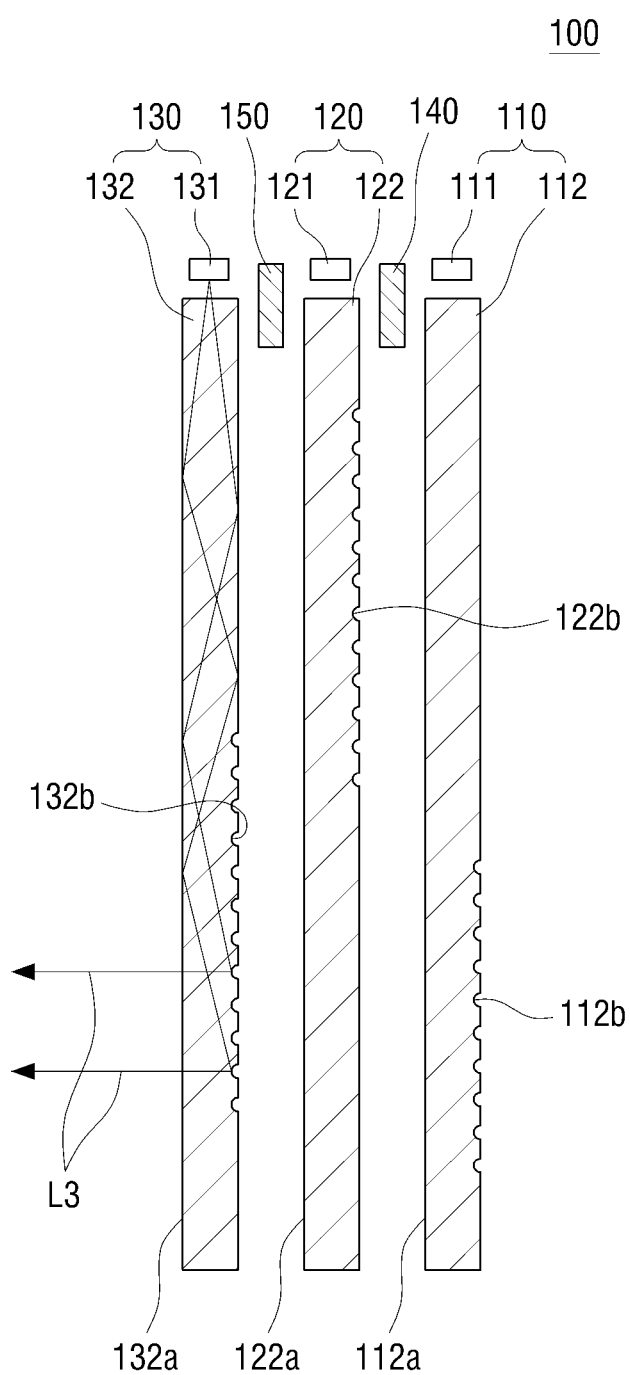
FIG. 9 is a schematic view showing an optical path by a third image forming unit according to an exemplary embodiment of the present disclosure.

FIG. 7 is a schematic view showing an optical path by a first image forming unit according to an exemplary embodiment of the present disclosure. FIG. 8 is a schematic view showing an optical path by a second image forming unit according to an exemplary embodiment of the present disclosure. FIG. 9 is a schematic view showing an optical path by a third image forming unit according to an exemplary embodiment of the present disclosure. Referring to FIG. 7, light L1 incident from the first light source unit 111 to the first light guide 112 may be reflected by the first reflection pattern 112*b* of the first light guide 112 to the emitting surface 112*a* and be emitted, and light emitted from the emitting surface 112*a* of the first light guide 112 may be transmitted through the second light guide 122 and the third light guide 132 and be emitted, thereby forming the first image.

Referring to FIG. 8, light L2 incident from the second light source unit 121 to the second light guide 122 may be reflected by the second reflection pattern 122*b* of the second light guide 122 to the emitting surface 122*a* and be emitted, and light emitted from the emitting surface 122*a* of the second light guide 122 may be transmitted through the third light guide 132 and be emitted, thereby forming the second image. Referring to FIG. 9, light L3 incident from the third light source unit 131 to the third light guide 132 may be reflected by the third reflection pattern 132*b* of the third light guide 132 to the emitting surface 132*a* and be emitted, thereby forming the third image.

As described above, an image may be formed by each of the first image forming unit 110, the second image forming unit 120, and the third image forming unit 130. The image display 100 may cause at least one image to be formed based on the light source unit in which light is generated among the first to third light source units 111, 121, 131. A color of an image displayed by the image display 100 may be determined based on a color of light generated from the first light source unit 111, the second light source unit 121, and the third light source unit 131.

In an exemplary embodiment of the present disclosure, it is described that light with different colors is generated from the first light source unit 111, the second light source unit 121, and the third light source unit 131, respectively. Hereinafter, in an exemplary embodiment of the present disclosure, it is described that light with a first color is generated from the first light source unit 111, light with a second color is generated from the second light source unit 121, and light with a third color is generated from the third light source unit 131. In particular, it may be understood that the generation of light with the first color from the first light source unit 111, the generation of light with the second color from the second light source unit 121, and the generation of light with the third color from the third light source unit 131 mean that the first image has the first color, the second image has the second color, and the third image has the third color.

When lights with different colors are generated from the first light source unit 111, the second light source unit 121, and the third light source unit 131, the vehicle lamp 1 of the present disclosure may be used for two or more lamps among various lamps installed in a vehicle. As an example, white light may be generated as the first color from the first light source unit 111, yellow light may be generated as the second color from the second light source unit 121, and blue light may be generated as the third color from the third light source unit 131. In this case, when the vehicle lamp 1 of the present disclosure is used as a daytime running lamp or a position lamp, the second light source unit 121 and the third light source unit 131 may be turned off and only the first light source unit 111 may be turned on. Further, when the vehicle lamp 1 of the present disclosure is used as a turn signal lamp, the first light source unit 111 and the third light source unit 131 may be turned off and only the second light source unit 121 may be turned on. In addition, when the vehicle lamp 1 of the present disclosure displays the charging state of the battery, all of the first to third light sources 111, 121, and 131 may be turned on at the same time or sequentially turned on based on a predetermined lighting sequence or the like.

According to the exemplary embodiment of the present disclosure, it is unnecessary to individually install lamps used for different functions or a lamp for indicating the charging state of the battery. Therefore, the required installation space may be reduced, the configuration may be simplified, and the cost may be decreased, compared with the installation space required when each lamp is separately installed.

A color of an image displayed from the image display 100 may have one of the first color, the second color, and the third color based on the light source unit in which light is generated among the first light source unit 111, the second light source unit 121, and the third light source unit 131. Further, the color of the image displayed from the image display 100 may have a fourth color in which at least two of the first to third colors are mixed. The fourth color may collectively refer to a color in which at least two of the first to third colors are mixed, and it may be understood that the fourth color has various colors based on the mixed colors among the first to third colors.

The image display 100 may display an image having the fourth color in addition to the first to third colors. Therefore, in order to give a visual effect in the process of forming images with the first to third colors alternately, the image display 100 may provide a visual effect in which the color of the image is gradually changed when switching from one to another of the first to third colors. In an example, images with the first to third colors may be sequentially formed at regular intervals by the image display 100. From a state where an image with the first color is formed, when the brightness of light generated from the first light source unit 111 gradually decreases and the brightness of light generated from the second light source unit 121 gradually increases, an image with the fourth color in which the first color and the second color are mixed may be formed during the switch from the first color to the second color.

Similarly, from a state where an image with the second color is formed, when the brightness of light generated from the second light source unit 121 gradually decreases and the brightness of light generated from the third light source unit 131 gradually increases, an image with the fourth color in which the second color and the third color are mixed may be formed during the switch from the second color to the third color. As such, the exemplary embodiment of the present disclosure may provide a visual effect such as a gradation effect that the image displayed from the image display 100 is gradually changed from the first color to the fourth color to the second color, and similarly, gradually changed from the second color to the fourth color to the third color.

Images formed by the first to third image forming units 110, 120, and 130 may have shapes that correspond to areas in which the reflection patterns 112*b*, 122*b*, and 132*b* are formed in the respective light guides 112, 122, and 132, in which when light is generated from two or more light sources of the first to third light sources 111, 121, and 131, a combination image in which two or more images are combined may be formed. The combination image may have a shape in which two or more of the first to third images are separated from each other, and may have a shape in which some of two or more of the first to third images overlap, and may have a shape in which the entire first to third images overlap.

When the combination image has a shape in which two or more of the first to third images are separated from each other, the combination image may respectively include areas having two or more colors of the first to third colors. When the combination image has a shape in which at least some of two or more of the first to third images overlap, the combined image may include an area having two or more colors of the first to third colors and an area having the fourth color in which two or more colors are mixed.

In the first to third image forming units 110, 120, and 130, the first to third light guides 112, 122 and 132 may be arranged along a direction in which light is emitted from the image display portion 100, and the first to third light source units 111, 121, and 131 may be disposed near one side ends of the first to third light guides 112, 122 and 132. Therefore, light generated from the first to third light source units 111, 121, and 131 may be incident on other adjacent light guides as well as the first to third light guides 112, 122, and 132. Further, in this case, the image formed by the image display 100 may have a color different from the desired color. In view thereof, according to the exemplary embodiment of the present disclosure, light obstruction units 140 and 150 may be positioned between the first and second light sources 111 and 121 and the second and third light sources 121 and 131, respectively, thereby preventing light generated from each of the first to third light sources 111, 121, and 131 from being incident on a light guide other than the corresponding light guide.

Hereinafter, in the exemplary embodiment of the present disclosure, the light obstruction unit 140 disposed between the first and second light source units 111 and 121 may be referred to as a first light obstruction unit, and the light obstruction unit 150 disposed between the second light source unit 121 and the third light source unit 131 may be referred to as a second light obstruction unit. The number of the light obstruction units may be varied based on the number of the image forming units included in the image display portion 100.

In an exemplary embodiment of the present disclosure, both ends of the first light obstruction unit 140 and the second light obstruction unit 150 may be formed to be connected to each other. It may be understood that it is to simplify the assembly of the first light obstruction unit 140 and the second light obstruction unit 150 compared to the case where the first light obstruction unit 140 and the second light obstruction unit 150 are separately assembled.

Figure 10:
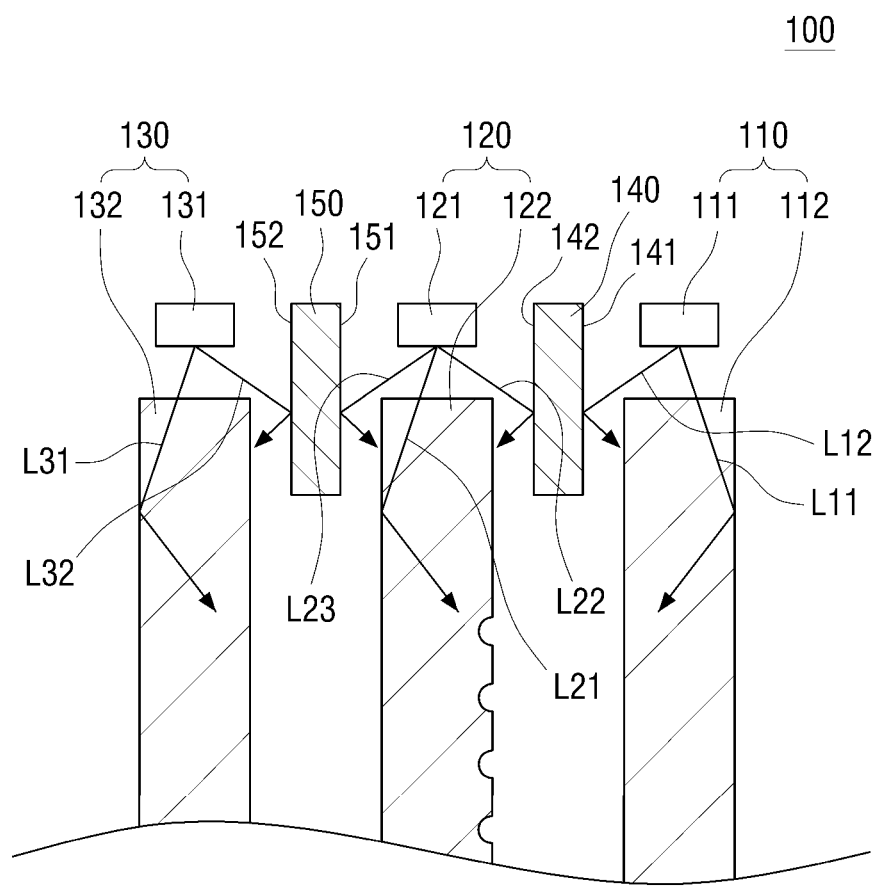
FIGS. 10 and 11 are schematic views showing optical paths by a light obstruction unit according to an exemplary embodiment of the present disclosure.

FIG. 10 is a schematic view showing a first light obstruction unit and a second light obstruction unit according to an exemplary embodiment of the present disclosure. Referring to FIG. 10, one end of the first light obstruction unit 140 may be disposed proximate to one side ends of the first light guiding part 112 and the second light guiding part 122, and the other end of the first light obstruction unit 140 may be formed to extend toward the other side ends of the first light guide 112 and the second light guide 122 through a space between the first light guide 112 and the second light guide 122.

The first light obstruction unit 140 may include surfaces 141 and 142 connecting one end and the other end. Hereinafter, in the exemplary embodiment of the present disclosure, among the surfaces 141 and 142 connecting the one end and the other end of the first light obstruction unit 140, a surface facing the first light source unit 111 may be referred to as a first surface 141 and the surface facing the second light source unit 121 may be referred to as a second surface 142. The first surface 141 of the first light obstruction unit 140 may obstruct light L12 directed to the second light guide 122 of light L11 and L12 generated from the first light source unit 111. The second surface 142 of the first light obstruction unit 140 may obstruct light L22 directed to the first light guide 112 of lights L21, L22, and L23 generated from the second light source unit 121.

Similarly, one end of the second light obstruction unit 150 may be disposed proximate to one side ends of the second light guiding part 122 and the third light guiding part 132, and the other end of the second light obstruction unit 150 may be formed to extend toward the other side ends of the second light guide 122 and the third light guide 132 through a space between the second light guide 122 and the third light guide 132.

The second light obstruction unit 150 may include a first surface 151 that faces the second light source unit 121 and a second surface 152 that faces the third light source unit 131. The first surface 151 may obstruct light L23 directed to the third light guide 132 of lights L21, L22, and L23 generated from the second light source unit 121. The second surface 152 may obstruct light L32 directed to the second light guide 122 of light L31 and L32 generated from the third light source unit 131.

The first light obstruction unit 140 and the second light obstruction unit 150 may use a black color light absorbing member to obstruct light. A reflection layer made of a material having a high reflectance such as aluminum or chromium may be formed on the first and second surfaces 141 and 151 and the second surfaces 142 and 152 to obstruct light. In an exemplary embodiment of the present disclosure below, a reflective layer may be formed on the first surfaces 141 and 151 and the second surfaces 142 and 152.

Figure 11:
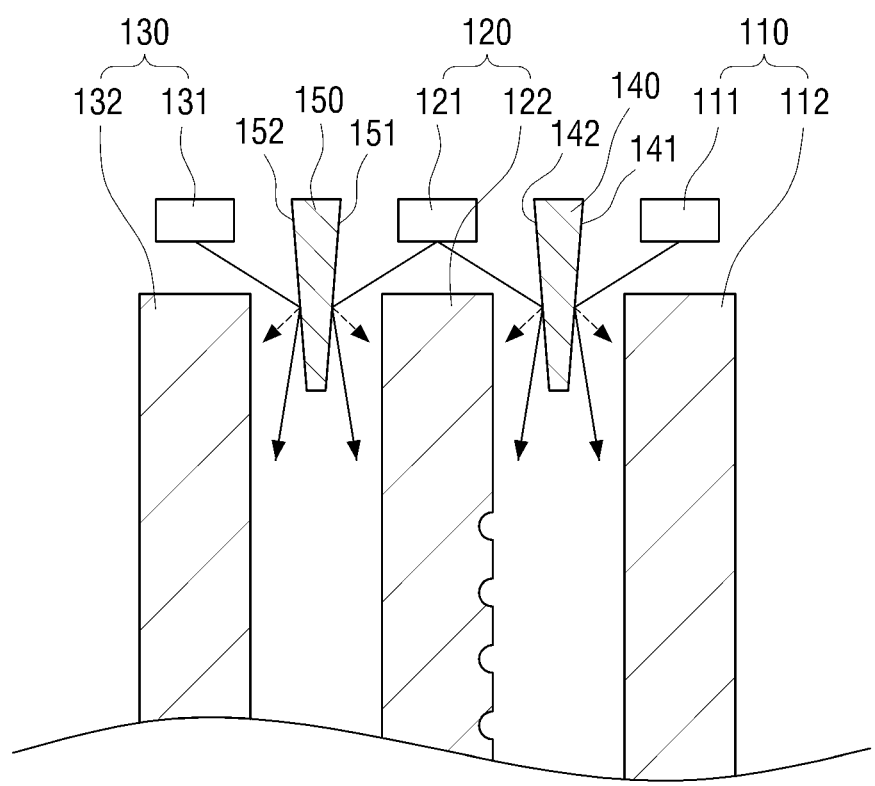

As shown in FIG. 11, a distance between the first surfaces 141 and 151 and the second surfaces 142 and 152 of the first light obstruction unit 140 and the second light obstruction unit 150 may be formed to have a predetermined inclination angle from one end to the other end. Such configuration may allow light generated from the first light source unit 111, the second light source unit 121, and the third light source unit 131 to reach a relatively farther position. In other words, when a distance (e.g., width or thickness) between the first surface 141 and 151 and the second surface 142 and 152 is the same from one end to the other end, a position where light reflected by the first light obstruction unit 140 and the second light obstruction unit 150 reaches, as shown by the dotted line in FIG. 11, may be relatively close (e.g., proximate). When the distance between the first surface 141 and 151 and the second surface 142 and 152 decreases from one end to the other end, the position where the light reflected by the first light obstruction unit 140 and the second light obstruction unit 150 reaches may be relatively distant.

A shape of the first light obstruction unit 140 and the second light obstruction unit 150 is not limited to the above example, and it may be formed to have various inclination angles based on on the position where the light reflected by the first light obstruction unit 140 and the second light obstruction unit 150 reaches. In the above exemplary embodiment, two light obstruction units may be used as the light obstruction units 140 and 150. It is because three image forming units are used as the plurality of image forming units 110, 120, and 130. As the number of image forming units increases, the number of light obstruction units may also increase. As an example, when the number of image forming units is n (n≥2), n−1 (n≥2) light obstruction units may be used.

Further, when light is reflected by the first light obstruction unit 140 and the second light obstruction unit 150, a diffusion pattern may be formed on the first surface 141 and 151 and the second surface 142 and 152, respectively. This diffusion pattern is for preventing a difference in brightness due to the spacing of the light sources included in each of the first, second, and third light source units 111, 121, and 131. In other words, the light sources included in the first light source unit 111, the second light source unit 121, and the third light source unit 131 may be disposed to have a predetermined distance or more to prevent structural interference. In this case, the brightness of light may be relatively lower in a distance between the adjacent light sources, and the brightness of the image formed by the image display 100 may become uneven.

In the exemplary embodiment of the present disclosure, when the light is reflected by the first light obstruction unit 140 and the second light obstruction unit 150, a diffusion pattern may be formed to diffuse the light reflected from the first surfaces 141 and 151 and the second surfaces 142 and 152, thereby reducing the brightness difference or unevenness due to the distance between the adjacent light sources to have the overall uniform brightness of the image formed by the image display 100.

Figure 12:
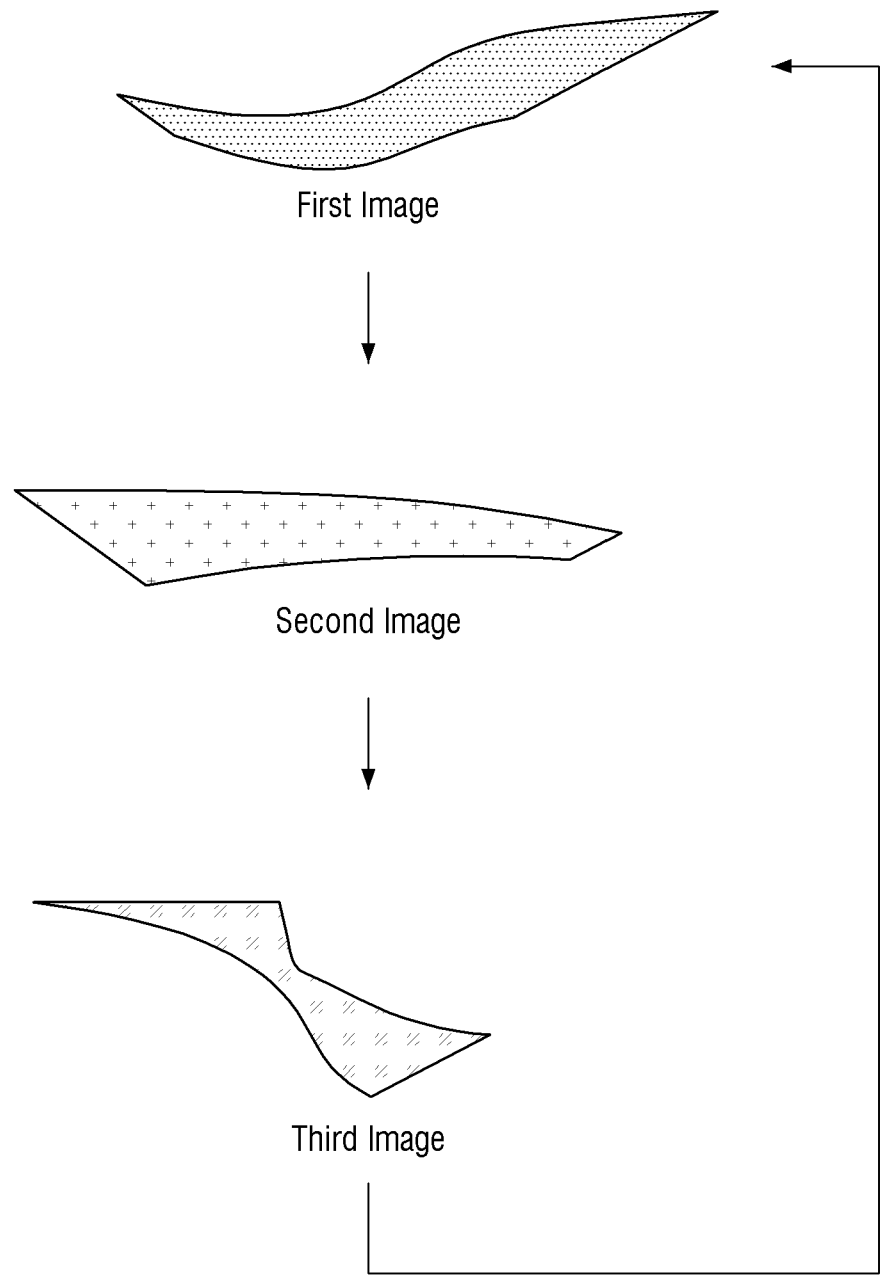
FIGS. 12 to 14 are schematic views showing images displayed by an image display according to an exemplary embodiment of the present disclosure.
Figure 13:
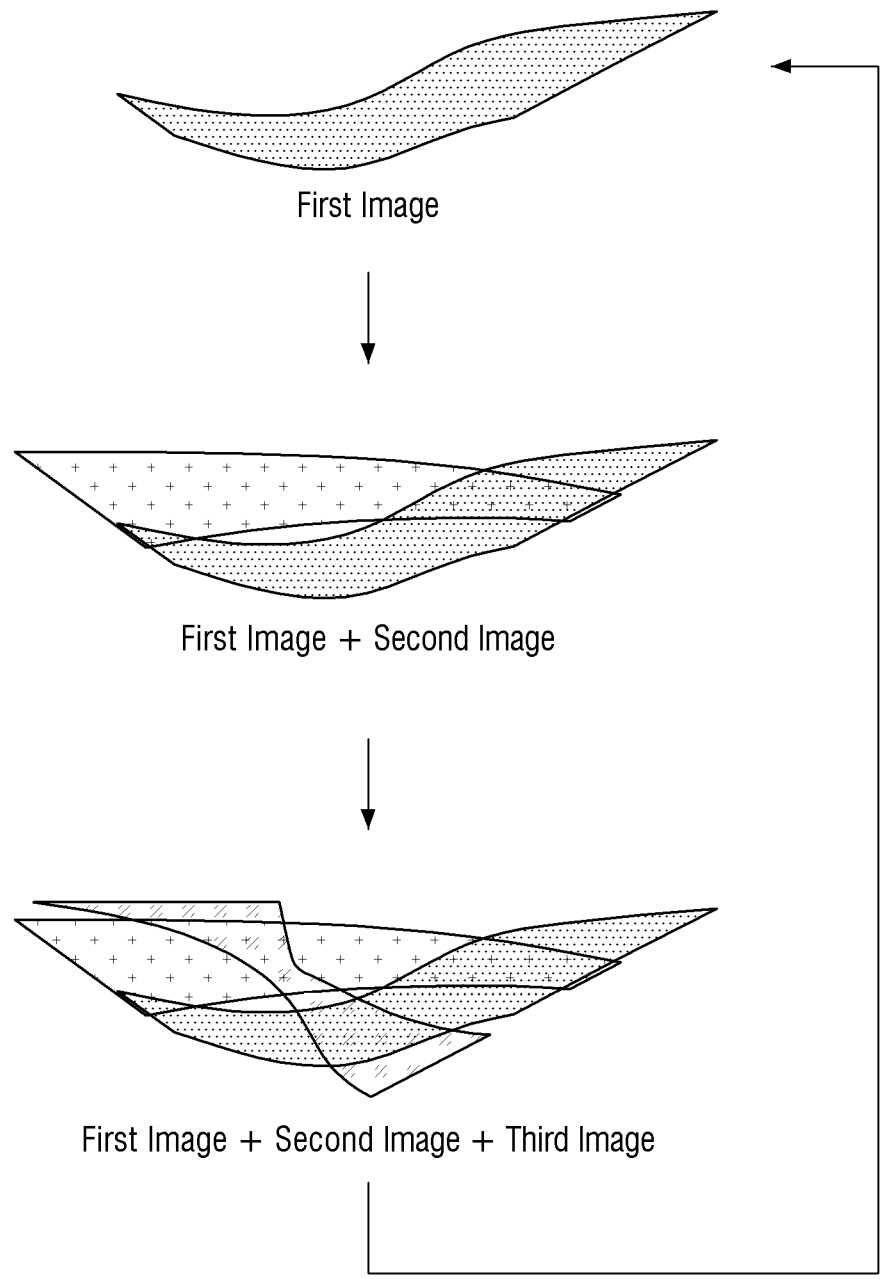

The controller 200 may cause an image by at least one of the first to third image forming units 110, 120, and 130 to be formed, and the controller 200 may cause an image to be sequentially formed based on a predetermined order. The image formed by the controller 200 may include first to third images formed by the first to third image forming units 110, 120, and 130 and a combination image in which two or more of the first to third images are combined. For example, the controller 200 may cause the first to third images to be sequentially and individually displayed as shown in FIG. 12. Further, the controller 200 may cause the first to third images overlapped on each other to be sequentially displayed as shown in FIG. 13. In addition, the controller 200 may cause the first image, an image in which the first image and the second image are combined, the second image, an image in which the second image and the third image are combined, the third image, and an image in which the first image and the third image are combined to be sequentially displayed as shown in FIG. 14.

In an example shown in FIG. 12, the first to third light sources 111, 121, and 131 may be sequentially turned on and off to allow the second light source unit 121 to be turned on after the first light source unit 111 is turned off, and the third light source unit 131 to be turned on after the second light source unit 121 is turned off, and thus, the first to third images may be individually displayed. In an example shown in FIG. 13, the second light source unit 121 may be turned on after a predetermined time elapses in a state in which the first light source unit 111 is turned on, and the third light source unit 131 may be turned on after the predetermined time elapses in a state in which the first light source unit 111 and the second light source unit 121 are turned on together, and thus, the first to third light source units 111, 121, and 131 may be sequentially overlapped and displayed. In an example shown in FIG. 14, the brightness of each of the light source units 111, 121, and 131 may gradually decrease or increase in the process of sequentially forming the first to third images, and thus, a combination image in which two images are combined may be formed while switching from the current image to the next image.

Figure 14:
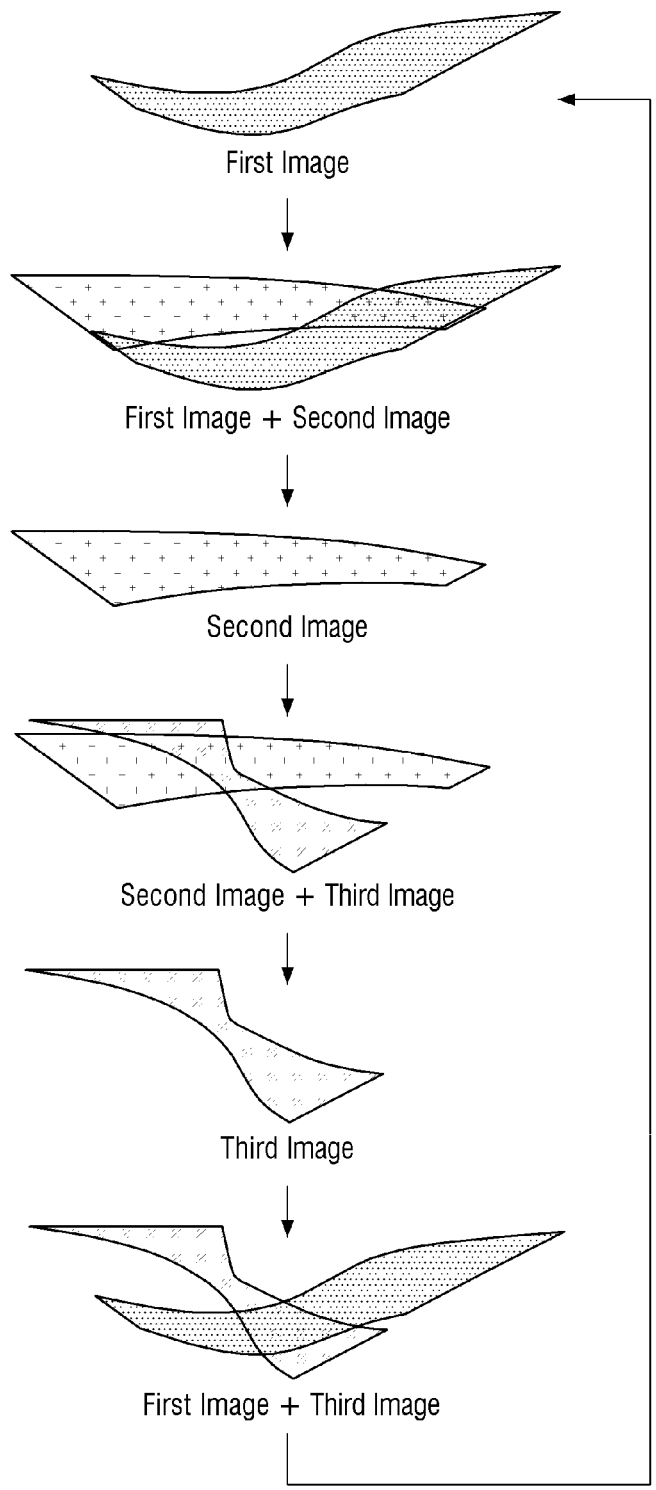

The image displayed by the controller 200 is not limited to the above-described FIGS. 12 to 14. Images including at least one of the first to third images may be sequentially displayed as needed, and the first to third images may be simultaneously displayed.

Figure 15:
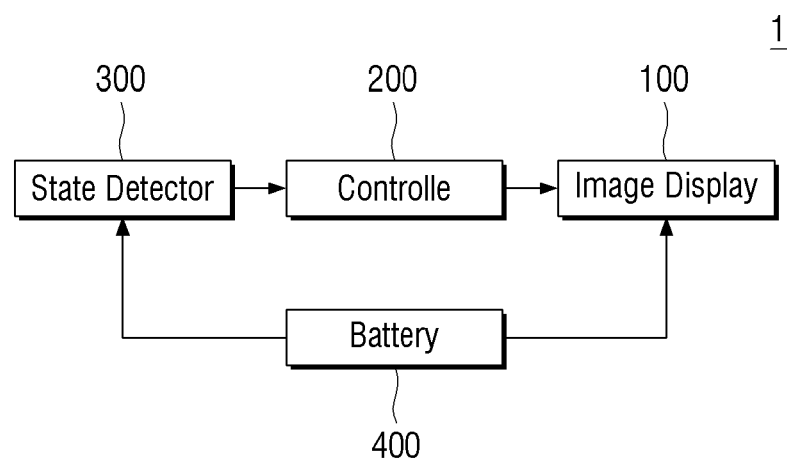
FIG. 15 is a block diagram showing the configuration of a vehicle lamp according to another exemplary embodiment of the present disclosure.

FIG. 15 is a block diagram showing the configuration of a vehicle lamp according to another exemplary embodiment of the present disclosure. Referring to FIG. 15, the vehicle lamp 1 according to another exemplary embodiment of the present disclosure may include an image display 100, a controller 200, and a state detector 300. In an example shown in FIG. 15, the vehicle lamp 1 of the present disclosure may display a charging state of a battery 400. In the another exemplary embodiment of the present disclosure, the same reference numerals are used for the same components as those in the above-described exemplary embodiment, and a detailed description thereof will be omitted.

The state detector 300 in the another exemplary embodiment of the present disclosure may detect the charging state of the battery 400, such as whether the battery 400 is charged or the amount of charge of the battery 400. For example, the state detector 300 may detect whether the battery 400 is charged by determining whether a connector for charging the battery 400 is electrically connected to a connector of the battery 400, and may detect the charged amount of the battery 400 by voltage detection of the battery 400 or the like.

Figure 16:
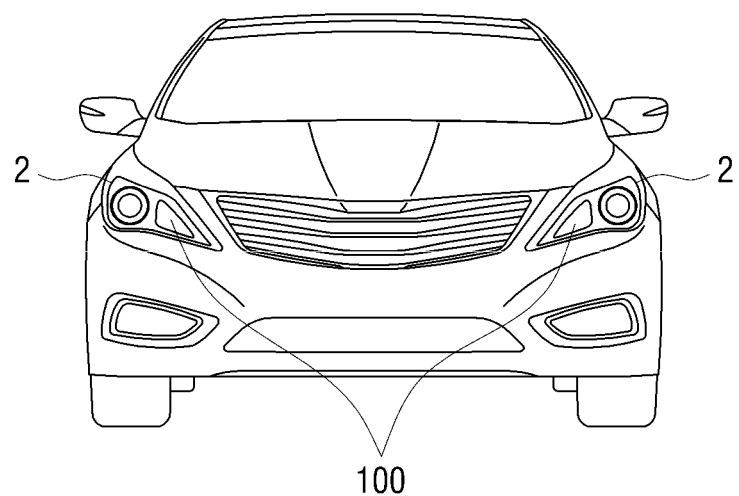
FIG. 16 is a schematic view showing a vehicle installed with an image display according to another exemplary embodiment of the present disclosure.

In the another exemplary embodiment of the present disclosure, the controller 200 may cause an image according to the above order of FIGS. 12 to 14, or the like to be displayed, while the battery 400 is being charged. In the another exemplary embodiment of the present disclosure, the image display 100 may be installed in head lamps 2 as shown in FIG. 16. However, the present disclosure is not limited thereto, and the image display 100 may be installed at various positions where the charging state of the battery 400 may be easily checked from the outside.

Figure 17:
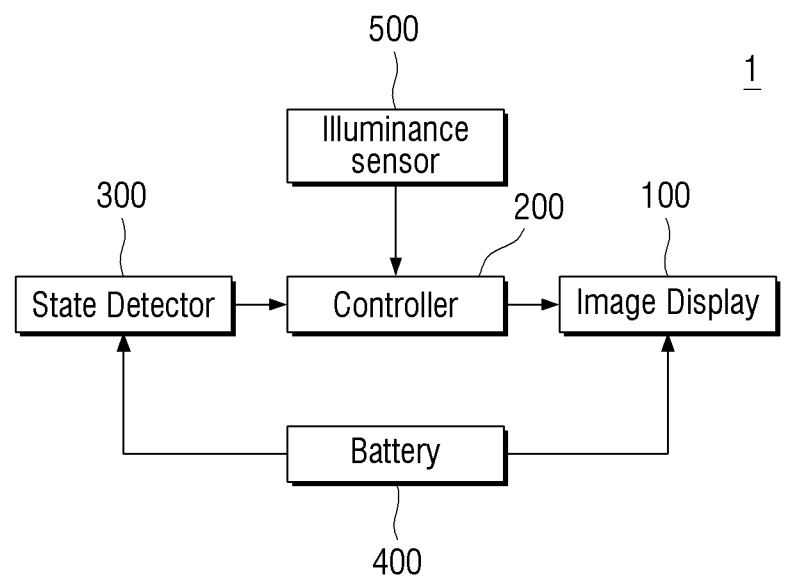
FIG. 17 is a block diagram showing the configuration of a vehicle lamp according to still another exemplary embodiment of the present disclosure.

FIG. 17 is a block diagram showing the configuration of a vehicle lamp according to still another exemplary embodiment of the present disclosure. Referring to FIG. 17, the vehicle lamp 1 according to still another exemplary embodiment of the present disclosure may include an image display 100, a controller 200, a status detection unit 300, and an illuminance sensor 500. In the still another exemplary embodiment of the present disclosure, the same reference numerals are used for the same components as those in the above-described embodiments, and a detailed description thereof will be omitted.

In the still another exemplary embodiment of the present disclosure, the illuminance sensor 500 may sense the illuminance around the vehicle, and the controller 200 may adjust the brightness of light generated from the image display 100 based on the illuminance transmitted from the illuminance detector 500. In particular, the illuminance sensor 500 may transmit the average value of the illuminance sensed for a predetermined time to the controller 200. This is intended to reduce the effect of temporarily increasing illuminance due to external factors.

The controller 200 may adjust the brightness of light generated from the image display 100 based on the illuminance around the vehicle. Therefore, when the illuminance around the vehicle is high, it is possible to prevent the brightness of the light generated from the image display 100 from being relatively lowered and the visibility from deteriorating. Further, when the illuminance around the vehicle is low, it is possible to prevent inconveniences such as glare and the like from occurring to proximate vehicles and pedestrians due to the relatively high brightness of light generated from the image display 100.

Figure 18:
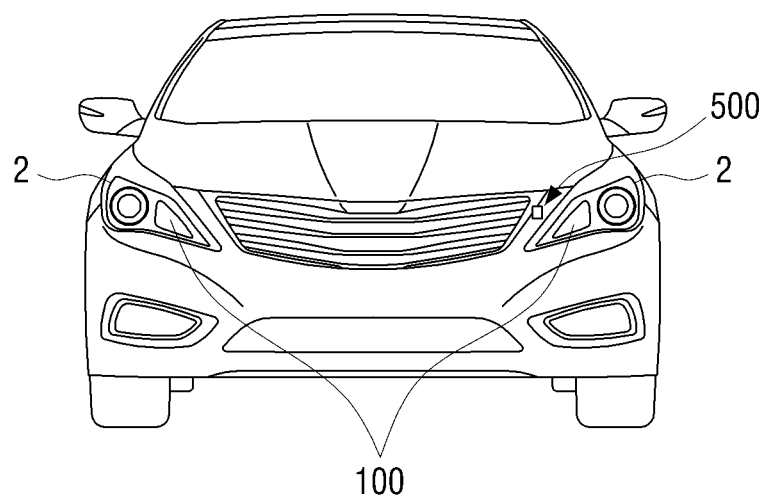
FIG. 18 is a schematic view showing an illuminance sensor installed in a vehicle according to still another exemplary embodiment of the present disclosure.

The controller 200 may increase the brightness of the light generated from the image display 100 to prevent a decrease of visibility as the ambient illuminance of the vehicle increases. On the contrary, the controller 200 may decrease the brightness of the light emitted from the image display 100 to prevent glare and the like as the ambient illuminance of the vehicle is decreased. The illuminance sensor 500 may be disposed in a direction in which light is emitted from the image display 100 as shown in FIG. 18. This is for enabling the brightness to be adjusted by sensing the illuminance in a direction in which the light generated from the image display 100 may be recognized. In other words, when the illuminance sensor 500 is disposed in a direction different from a direction in which the image display 100 is installed, the illuminance sensed by the illuminance sensor 500 may not directly affect the recognition of the light emitted from the image display 100. Therefore, when the illuminance sensor 500 is disposed in the direction in which the light is emitted from the image display 100, the brightness may be more accurately adjusted.

The exemplary embodiments as described above may include the status detection unit 300 and the illuminance sensor 500, respectively. However, the present disclosure is not limited thereto, and elements included in each of the above-described exemplary embodiments may be adapted from each other.

A skilled in the art may recognize that the present disclosure may be embodied in other specific forms without departing from the spirit or essential characteristics thereof. Therefore, it is to be understood that the above-described exemplary embodiments are illustrative in all aspects and not restrictive. The scope of the invention is indicated by the appended claims rather than the foregoing detailed description. It should be interpreted that the present disclosure covers the modifications and variations derived from the meaning and scope of the appended claims and their equivalents.

What is claimed is:
1. A vehicle lamp comprising:
an image display for displaying an image formed by a plurality of image forming units, each of the plurality of image forming units including a light source unit and a light guide for emitting light incident from the light source unit; and a controller configured to generate an image by at least one of the plurality of image forming units, wherein the plurality of image forming units comprises:

a first image forming unit comprising a first light source unit and a first light guide through which light incident from the first light source unit is emitted; and a second image forming unit comprising a second light source unit and a second light guide through which light incident from the second light source unit is emitted, wherein the light emitted from the first light guide is transmitted through the second light guide and emitted, wherein the vehicle lamp further comprises a light obstruction unit disposed between the first light source unit and the second light source unit, and wherein the light obstruction unit extends from a first end to a second end in an extending direction from first side ends of the first light guide and the second light guide toward second side ends of the first light guide and the second light guide, and a surface that connects the first end and the second end is inclined at a predetermined angle with respect to the extending direction of the light obstruction unit.

2. The vehicle lamp of claim 1, wherein the first light source unit and the second light source unit generate light with different colors.

3. The vehicle lamp of claim 1, wherein a surface of the first light guide and a surface of the second light guide are disposed to face each other, and wherein emitting surfaces of the first light guide and the second light guide are disposed to face a same direction.

4. The vehicle lamp of claim 1, wherein an image displayed by the image display have at least one color among a color of light generated from the first light source unit, a color of light generated from the second light source unit, and a color obtained by mixing the light generated from the first light source unit and the light generated from the second light source unit.

5. The vehicle lamp of claim 1, wherein a first reflection pattern and a second reflection pattern are formed on a surface of each of the first light guide and the second light guide to reflect the light incident from the first light source unit and the second light source unit to an emitting surface, and wherein each of the first image forming unit and the second image forming unit forms an image having a shape that corresponds to an area where the first reflection pattern and the second reflection pattern are formed.

6. The vehicle lamp of claim 5, wherein the first reflection pattern and the second reflection pattern are formed in an area in which an image formed by each of the first image forming unit and the second image forming unit is formed separately from each other.

7. The vehicle lamp of claim 5, wherein the first reflection pattern and the second reflection pattern are formed in an area where at least a part of an image formed by each of the first image forming unit and the second image forming unit is overlapped.

8. The vehicle lamp of claim 1, wherein the first light source unit and the second light source unit are disposed proximate to the first side ends of the first light guide and the second light guide.

9. The vehicle lamp of claim 1, wherein the light obstruction unit is configured to absorb at least a part of light generated from at least one of the first light source unit and the second light source unit.

10. The vehicle lamp of claim 1, wherein the light obstruction unit is configured to reflect at least a part of light generated from at least one of the first light source unit and the second light source unit.

11. The vehicle lamp of claim 1, wherein the surface that connects the first end and the second end of the light obstruction unit comprises a first surface facing the first light source unit and a second surface facing the second light source unit, and wherein a distance between the first surface and the second surface becomes smaller from the first end to the second end of the light obstruction unit.

12. The vehicle lamp of claim 1, wherein each of the first light source unit and the second light source unit comprises a plurality of light sources disposed at a predetermined distance, and wherein a diffusion pattern for diffusing light generated from one of the plurality of light sources is formed on at least one surface of the light obstruction unit.

13. The vehicle lamp of claim 1, wherein the controller causes at least one of a first image formed by the first image forming unit, a second image formed by the second image forming unit, and an image combined with the first image and the second image to be displayed from the image display.

14. The vehicle lamp of claim 1, wherein the controller causes the first light source unit and the second light source unit to be sequentially turned on.

15. The vehicle lamp of claim 1, wherein the controller causes the first light source unit and the second light source unit to be simultaneously turned on.

16. The vehicle lamp of claim 1, further comprising a state detector for detecting a charging state of a battery, wherein the controller causes the image to be formed from the image display based on the detected charging state.

17. The vehicle lamp of claim 1, further comprising an illuminance sensor, wherein the controller adjusts brightness of image displayed by the image display based on a sensed illuminance.

18. The vehicle lamp of claim 17, wherein the illuminance sensor is disposed in a direction in which the light is emitted from the image display.

* * * * *